US010740819B2

(12) United States Patent
Lin et al.

(10) Patent No.: US 10,740,819 B2
(45) Date of Patent: Aug. 11, 2020

(54) INFORMATION PROVIDING DEVICE, METHOD, AND NON-TRANSITORY MEDIUM FOR INTERACTIVE SEARCH REFINEMENT

(71) Applicant: Rakuten, Inc., Tokyo (JP)

(72) Inventors: Yanpeng Lin, Setagaya-ku (JP); Takahiro Ito, Setagaya-ku (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 782 days.

(21) Appl. No.: 15/106,353

(22) PCT Filed: Apr. 23, 2014

(86) PCT No.: PCT/JP2014/061426
§ 371 (c)(1),
(2) Date: Jun. 20, 2016

(87) PCT Pub. No.: WO2015/162719
PCT Pub. Date: Oct. 29, 2015

(65) Prior Publication Data
US 2016/0335693 A1 Nov. 17, 2016

(51) Int. Cl.
*G06Q 30/06* (2012.01)
*G06F 16/9032* (2019.01)
*G06F 16/242* (2019.01)

(52) U.S. Cl.
CPC ..... *G06Q 30/0625* (2013.01); *G06F 16/2425* (2019.01); *G06F 16/90324* (2019.01)

(58) Field of Classification Search
CPC ..... G06Q 30/06; G06Q 30/0601–0643; G06Q 30/08; G06F 16/00; G06F 16/182;
(Continued)

(56) References Cited

U.S. PATENT DOCUMENTS 8,538,984 B1 * 9/2013 Mahabal ............. G06F 16/2453
707/769
2006/0253427 A1 * 11/2006 Wu ................... G06F 16/90324
(Continued)

FOREIGN PATENT DOCUMENTS

JP 2004-178421 A 6/2004
JP 2009-122849 A 6/2009
(Continued)

OTHER PUBLICATIONS

Data Mining for Web Intelligence. Jiawei Han. Kevin Chen-Chuan Chang. University of Illinois at Urbana-Champaign. Nov. 2002. (Year: 2002).*

(Continued)

*Primary Examiner* — William J Allen
(74) *Attorney, Agent, or Firm* — Sughrue Mion, PLLC

(57) ABSTRACT

An obtaining unit (120) obtains a ranking of a commercial product belonging to a category defined on an e-marketplace. A collecting unit (121) collects a term relevant to a commercial product at an upper position in the obtained ranking from a text contained in a sales page for selling the upper ranking position commercial product or a search query that triggers the sales page to be viewed. A calculating unit (122) calculates a score of each collected term based on at least a number of collections of the term. A presenting unit (123) presents, as a suggested keyword for search refinement of the commercial product belonging to the category, the term with the calculated score in an upper ranking position.

9 Claims, 22 Drawing Sheets

(58) Field of Classification Search
CPC ............... G06F 16/24; G06F 16/242; G06F 16/2453–24578; G06F 16/248
See application file for complete search history.

(56) References Cited

U.S. PATENT DOCUMENTS

2007/0022085 A1* 1/2007 Kulkarni ............ G06F 16/9566
2007/0282811 A1* 12/2007 Musgrove ............ G06F 16/951
2011/0289088 A1* 11/2011 Yarin .................. G06F 16/70
 707/738
2015/0120689 A1* 4/2015 Miao .................. G06F 16/951
 707/706

FOREIGN PATENT DOCUMENTS

JP   2012-194685 A   10/2012
WO   2014/020929 A1   2/2014

OTHER PUBLICATIONS

A Survey of Automatic Query Expansion in Information Retrieval. Claudio Carpentini. Fondazione Ugo Bordoni. Article in ACM Computing Surveys • Jan. 2012 (Year: 2012).*
English Translation of the Written Opinion (ISA/237) for PCT/JP2014/061426Filing Date (Year: 2016).*
International Search Report of PCT/JP2014/061426, dated Jun. 17, 2014. [PCT/ISA/210].
Written Opinion of PCT/JP2014/061426, dated Jun. 17, 2014. [PCT/ISA/237].

* cited by examiner

FIG. 5

COMMERCIAL PRODUCT DATABASE

400

| COMMERCIAL PRODUCT ID | COMMERCIAL PRODUCT NAME | CATEGORY ID | SHOP ID | PRICE | COMMERCIAL PRODUCT DESCRIPTION |
|---|---|---|---|---|---|
| M001 | A-LINE ONE-PIECE SUIT | J011 | S001 | 8000 | POPULAR FLORAL PRODUCT··· |
| M002 | FRILLY ONE-PIECE SUIT | J011 | S002 | 7500 | FREE SHIPPING, ONLY NOW··· |
| M003 | SPRING ONE-PIECE SUIT | J112 | S003 | 9500 | FORMAL AND ALSO FPR COMMUTING··· |
| M004 | LONG-SLEEVE ONE-PIECE SUIT | J011 | S004 | 8000 | BEST FOR BRIDAL, FREE SHIPPING··· |
| M005 | SHORT-SLEEVE ONE-PIECE SUIT | J112 | S005 | 6500 | PROVIDED WITH POPULAR COLORS, LARGE SIZE··· |
| ··· | ··· | ··· | ··· | ··· | ··· |
| ··· | ··· | ··· | ··· | ··· | ··· |
| ··· | ··· | ··· | ··· | ··· | ··· |
| ··· | ··· | ··· | ··· | ··· | ··· |

PURCHASE TABLE

| COMMERCIAL PRODUCT ID | CATEGORY ID | PRICE | QUANTITY | SEARCH QUERY |
|---|---|---|---|---|
| M001 | J011 | 8000 | 240 | ONE-PIECE SUIT, PINK··· |
| M002 | J011 | 7500 | 300 | GARNISH, LARGE, ONE-PIECE SUIT··· |
| M003 | J001 | 9500 | 150 | FOR ENROLLEMENT CEREMONY, ONE-PIECE SUIT |
| M004 | J112 | 8500 | 320 | SHORT, SLEEVE··· |
| ··· | ··· | ··· | ··· | ··· |
| ··· | ··· | ··· | ··· | ··· |
| ··· | ··· | ··· | ··· | ··· |
| ··· | ··· | ··· | ··· | ··· |

RANKING TABLE FOR CATEGORY J011

| COMMERCIAL PRODUCT ID | TOTAL AMOUNT OF SALES | RANKING |
|---|---|---|
| M004 | 2720 THOUSAND YEN | 1 |
| M002 | 2250 THOUSAND YEN | 2 |
| M001 | 1920 THOUSAND YEN | 3 |
| ... | ... | 4 |

FIG. 10

ONE-PIECE CATEGORY RELEVANT TERM TABLE

| RELEVANT TERM |
| --- |
| FREE SHIPPING |
| GIFT |
| MINI ONE-PIECE SUIT |
| GIFT |
| FREE SHIPPING |
| MINI ONE-PIECE SUIT |
| MINI SPRING ONE-PIECE SUIT |
| LONG SLEEVE |
| MINI ONE-PIECE SUIT |
| MINI SPRING ONE-PIECE SUIT |
| ... |
| ... |

DRESS CATEGORY RELEVANT TERM TABLE

FIG. 12

ONE-PIECE CATEGORY RELEVANT TERM
APPEARANCE FREQUENCY TABLE

| RELEVANT TERM | APPEARANCE FREQUENCY |
|---|---|
| GIFT | 2 |
| FREE SHIPPING | 2 |
| MINI ONE-PIECE SUIT | 3 |
| MINI SPRING ONE-PIECE SUIT | 2 |
| LONG SLEEVE | 1 |
| ... | ... |
| ... | ... |
| ... | ... |

1200

DRESS CATEGORY RELEVANT TERM APPEARANCE FREQUENCY TABLE

| RELEVANT TERM | APPEARANCE FREQUENCY |
|---|---|
| SECOND PARTY | 1 |
| FREE SHIPPING | 2 |
| BRIDAL | 2 |
| FUNERAL CEREMONY | 2 |
| GIFT | 1 |
| FUNERAL | 2 |
| ... | ... |
| ... | ... |

FIG. 17

WOMEN'S FASHION CATEGORY RELEVANT TERM
APPEARANCE FREQUENSY TABLE

| RELEVANT TERM | APPEARANCE FREQUENCY |
|---|---|
| GIFT | 3 |
| FREE SHIPPING | 4 |
| MINI ONE-PIECE SUIT | 3 |
| MINI SPRING ONE-PIECE SUIT | 2 |
| LONG SLEEVE | 1 |
| BRIDAL | 2 |
| FUNERAL CEREMONY | 2 |
| SECOND PARTY | 1 |
| FUNERAL | 2 |

FIG. 18

| RELEVANT TERM | APPEARANCE FREQUENCY | NUMBER OF CHILD CATEGOIRES | NEMBER OF CATEGORIES WHERE TERM APPEARS | CONTRARY CATEGORY FREQUENCY |
|---|---|---|---|---|
| FREE SHIPPING | 4 | 2 | 2 | 0 |
| GIFT | 3 | 2 | 2 | 0 |
| MINI ONE-PIECE SUIT | 3 | 2 | 1 | 0.301 |
| MINI SPRING ONE-PIECE SUIT | 2 | 2 | 1 | 0.301 |
| FUNERAL | 2 | 2 | 1 | 0.301 |
| BRIDAL | 2 | 2 | 1 | 0.301 |
| FUNERAL CEREMONY | 2 | 2 | 1 | 0.301 |
| SECOND PARTY | 1 | 2 | 1 | 0.301 |
| LONG SLEEVE | 1 | 2 | 1 | 0.301 |

FIG. 19

| RELEVANT TERM | APPEARANCE FREQUENCY | CONTRARY CATEGORY FREQUENCY | APPEARANCE FREQUENCY X CONTRARY CATEGORY FREQUENCY |
|---|---|---|---|
| FREE SHIPPING | 4 | 0 | 0 |
| GIFT | 3 | 0 | 0 |
| MINI ONE-PIECE SUIT | 3 | 0.301 | 0.903 |
| MINI SPRING ONE-PIECE SUIT | 2 | 0.301 | 0.602 |
| FUNERAL | 2 | 0.301 | 0.602 |
| BRIDAL | 2 | 0.301 | 0.602 |
| FUNERAL CEREMONY | 2 | 0.301 | 0.602 |
| SECOND PARTY | 1 | 0.301 | 0.301 |
| LONG SLEEVE | 1 | 0.301 | 0.301 |

FIG. 20A

| RELEVANT TERM | APPEARANCE FREQUENCY |
|---|---|
| FREE SHIPPING | 4 |
| GIFT | 3 |
| MINI ONE-PIECE SUIT | 3 |
| MINI SPRING ONE-PIECE SUIT | 2 |
| FUNERAL | 2 |
| BRIDAL | 2 |
| FUNERAL CEREMONY | 2 |
| SEDONG PARTY | 1 |
| LONG SLEEVE | 1 |

FIG. 20B

| RELEVANT TERM | APPEARANCE FREQUENCY X CONTRARY CATEGORY FREQUENCY |
|---|---|
| MINI ONE-PIECE SUIT | 1.505 |
| MINI SPRING ONE PIECE SUIT | 0.602 |
| FUNERAL | 0.602 |
| BRIDAL | 0.602 |
| FUNERAL CEREMONY | 0.602 |
| SECOND PARTY | 0.301 |
| LONG SLEEVE | 0.301 |
| FREE SHIPPING | 0 |
| GIFT | 0 |

FIG. 20C

| RELEVANT TERM | APPEARANCE FREQUENCY X CONTRARY CATEGORY FREQUENCY |
|---|---|
| MINI ONE-PIECE SUIT | 0.903 |
| FUNERAL | 0.903 |
| BRIDAL | 0.602 |
| SECOND PARTY | 0.602 |
| LONG SLEEVE | 0.602 |
| FREE SHIPPING | 0.301 |
| GIFT | 0.301 |

INFORMATION PROVIDING DEVICE, METHOD, AND NON-TRANSITORY MEDIUM FOR INTERACTIVE SEARCH REFINEMENT

CROSS REFERENCE TO RELATED APPLICATIONS

This application is a National Stage of International Application No. PCT/JP2014/061426 filed Apr. 23, 2014, the contents of all of which are incorporated herein by reference in their entirety.

TECHNICAL FIELD

The present disclosure relates to an information providing device, an information providing method, a program and a non-transitory recording medium.

BACKGROUND ART

Conventionally, commercial product search devices are known which present, to a customer, information on commercial product, in order to further refine a search result on a shopping site or an auction site over the Internet, and which assist the search refinement (see, for example, Patent Literature 1).

CITATION LIST

Patent Literature

Patent Literature 1: Unexamined Japanese Patent Application Kokai Publication No. 2012-194685

SUMMARY OF INVENTION

Technical Problem

However, information on commercial product presented by such commercial product search devices is not weighted in accordance with the content shown by such information, and pieces of searched information on the commercial products are likely to be presented equally. Hence, information on the commercial products to be presented often contains improper terms for search refinement, such as a generic name and a category name.

The present disclosure has been made in view of the aforementioned circumstances, and it is an objective of the present disclosure to provide an information providing device, an information providing method, a program, and a non-transitory recording medium which can present, to a customer, a suggested keyword appropriate as a term for search refinement.

Solution to Problem

In order to accomplish the above objective, an information providing device according to a first aspect of the present disclosure includes:
an obtaining unit that obtains a ranking of a commercial product belonging to a category defined on an e-marketplace;
a collecting unit that collects a term relevant to a commercial product at an upper position in the obtained ranking from a text contained in a sales page for selling the upper ranking position commercial product or a search query that triggers the sales page to be viewed;
a calculating unit that calculates a score of each collected term based on at least a number of collections of the term; and
a presenting unit that presents, as a suggested keyword for search refinement of the commercial product belonging to the category, the term with the calculated score at an upper ranking position.

In the above information providing device:
in the e-marketplace, a category hierarchy may be defined by a tree structure with each category disposed at a node; and
the score of the collected term for the category may be defined based on a product:
(a) a weighting defined by the number of collections of the term; and
(b) a contrary category frequency defined by a number of child categories of the category, and a number of child categories where the term is collected among the child categories.

In the above information providing device, the score of the collected term for the category may be defined based on a value obtained by decreasing the number of collections of the term for the category on a basis of a number of collections of the term in another category.

In the above information providing device, a higher a similarity between the category and the other category is, a smaller a degree of decrease may become.

In the above information providing device:
in the e-marketplace, a category hierarchy may be defined by a tree structure with each category disposed at a node; and
in the tree structure, when the category and the other category are brotherhood categories, a similarity between the category and the other category may be high.

In the above information providing device:
in the e-marketplace, a category hierarchy may be defined by a tree structure with each category disposed at a node; and
in the tree structure, when a distance between the category to the other category is short, a similarity between the category and the other category may be high.

In the above information providing device:
in the e-marketplace, each of a plurality of shops may create the sales page, and the same commercial product belonging to the same category may be available from the respective sales pages; and
the ranking may be obtained for each category to which the sold commercial product belongs regardless of from which shop the commercial product is sold.

In order to accomplish the above objective, an information providing method according to a second aspect of the present disclosure is executed by an information providing device including an obtaining unit, a collecting unit, a calculating unit, and a presenting unit, and, the method includes:
obtaining by the obtaining unit a ranking of a commercial product belonging to a category defined on an e-marketplace;
collecting by the collecting unit a term relevant to a commercial product at an upper position in the obtained ranking from a text contained in a sales page for selling the upper ranking position commercial product or a search query that triggers the sales page to be viewed;

calculating by the calculating unit a score of each collected term based on at least a number of collections of the term; and presenting by the presenting unit, as a suggested keyword for search refinement of the commercial product belonging to the category, the term with the calculated score at an upper ranking position.

In order to accomplish the above objective, a program according to a third aspect of the present disclosure causes a computer to function as:

an obtaining unit that obtains a ranking of a commercial product belonging to a category defined on an e-marketplace;

a collecting unit that collects a term relevant to a commercial product at an upper position in the obtained ranking from a text contained in a sales page for selling the upper ranking position commercial product or a search query that triggers the sales page to be viewed;

a calculating unit that calculates a score of each collected term based on at least a number of collections of the term; and a presenting unit that presents, as a suggested keyword for search refinement of the commercial product belonging to the category, the term with the calculated score at an upper ranking position.

In order to accomplish the above objective, a non-transitory computer-readable recording medium according to a fourth aspect of the present disclosure has stored therein a program that causes a computer to function as:

an obtaining unit that obtains a ranking of a commercial product belonging to a category defined on an e-marketplace;

a collecting unit that collects a term relevant to a commercial product at an upper position in the obtained ranking from a text contained in a sales page for selling the upper ranking position commercial product or a search query that triggers the sales page to be viewed;

a calculating unit that calculates a score of each collected term based on at least a number of collections of the term; and a presenting unit that presents, as a suggested keyword for search refinement of the commercial product belonging to the category, the term with the calculated score at an upper ranking position.

The above program may be distributed and sold separately from a computer that executes the program over a computer communication network. In addition, the above recording medium may be a non-transitory recording medium that can be separately distributed and sold from the computer.

Advantageous Effects of Invention

According to the information providing device, the information providing method, the program and the non-transitory recording medium of the present disclosure, it becomes possible to provide, to a customer, a suggested keyword appropriate as a term for search refinement.

BRIEF DESCRIPTION OF DRAWINGS

FIG. 5 is a diagram illustrating example data stored in a commercial product database;

FIG. 10 is a diagram illustrating an example table of a relevant term for a given category;

FIG. 12 is a diagram illustrating an example table of appearance frequency of a relevant term;

FIG. 17 is a diagram illustrating another example table of appearance frequency of a relevant term;

FIG. 18 is a diagram illustrating an example table showing a contrary category frequency;

FIG. 19 is a diagram illustrating an example table showing a calculated weighting value based on a contrary category frequency;

FIG. 20A is a diagram illustrating an example score transition of a relevant term;

FIG. 20B is a diagram illustrating an example score transition of a relevant term; and FIG. 20C is a diagram illustrating an example score transition of a relevant term.

DESCRIPTION OF EMBODIMENTS

Embodiments of the present disclosure will be explained below with reference to the accompanying figures.

First Embodiment

Figure 1:
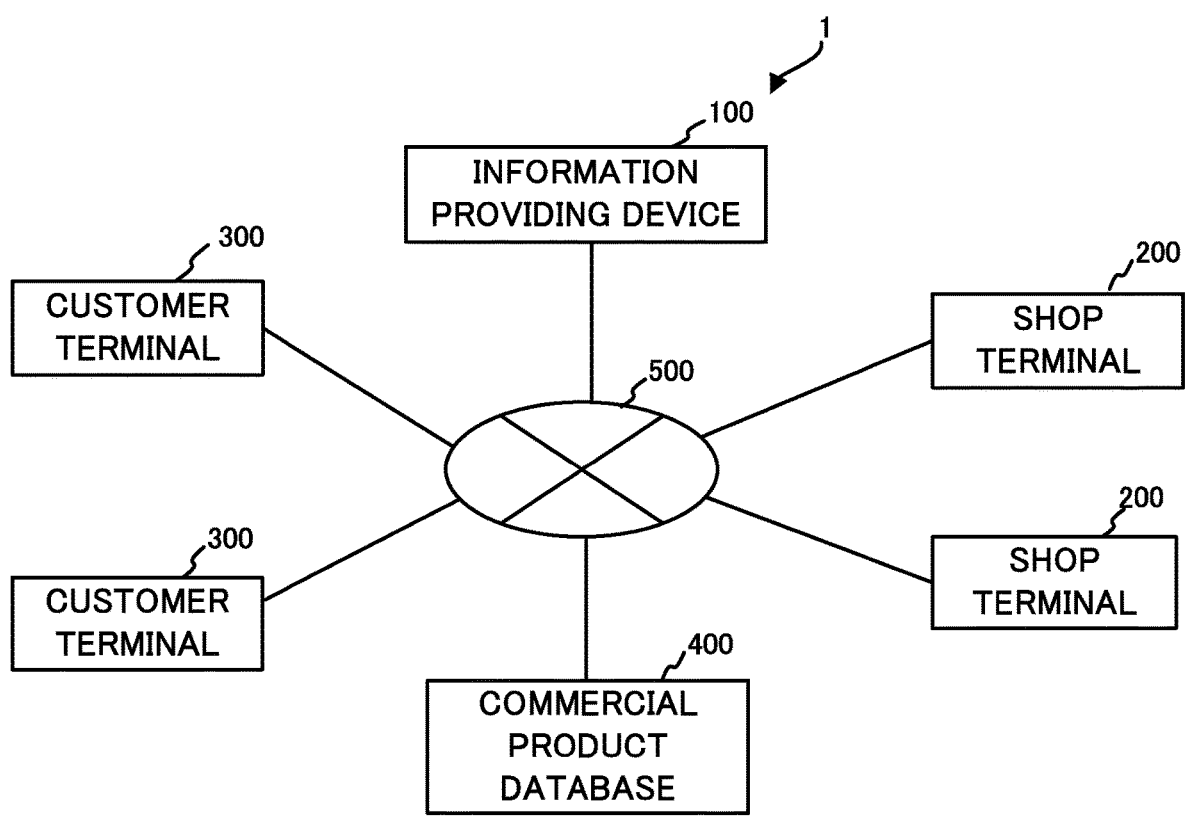
FIG. 1 is a diagram illustrating a structure of an information providing system according to an embodiment of the present disclosure.

FIG. 1 illustrates a general structure of an information providing system 1 according to this embodiment. The information providing system 1 is a system that provides a suggested keyword appropriate when a customer searches a commercial product in an e-marketplace. As illustrated in FIG. 1, the information providing system 1 includes an information providing device 100, shop terminals 200, customer terminals 300, and a commercial product database 400, and, the respective devices are connected so as to be communicable one another via the Internet 500.

The information providing device 100 is a computer system which searches commercial products in the commercial product database 400 based on a query specified by the customer, creates a ranking based on the commercial products purchased by customers from the searched commercial products, collects a term relevant to the commercial product in the ranking, and calculates a score from the collected term and presents a suggested keyword. More specifically, the information providing device 100 obtains a ranking for the commercial product to which purchase offers are made from the multiple customer terminals 300, collects a relevant term to the commercial product at the upper ranking position, calculates a score of the collected relevant term to the commercial product, and presents, to the customer terminal 300, the upper ranking score term as the suggested keyword. The information providing device 100 can be realized by various devices like a server device.

The shop terminal 200 is a computer operated by a shop that sells commercial products on the e-marketplace. The shop terminal 200 accepts an inputting of information on commercial products that the shop wants to sell, and transmits the information on the commercial products to the information providing device 100. In addition, the shop terminal 200 enables, in accordance with a request from the customer terminal 300, the customer to view, via the Internet 500, a commercial product sales page created by the shop.

The customer terminal 300 is a computer operated by the customer who purchases the commercial product on the e-marketplace. The customer terminal 300 accepts an inputting of information on the commercial product that the customer wants to purchase, and transmits purchase offer information to the shop terminal 200 through the information providing device 100. In addition, the customer terminal 300 displays, on a display, the suggested keyword presented by the information providing device 100.

The commercial product database 400 is a device that stores information on the commercial products that the shops want to sell on the e-marketplace. FIG. 5 illustrates example data stored in the commercial product database 400. The commercial product database 400 stores a commercial product ID, a commercial product name, a category ID, a shop ID, a commercial product price, and a commercial product description.

The commercial product name is a name of commercial product input by the shop, and is also a name of commercial product determined by the shop arbitrarily. The commercial product ID is an identifier defined corresponding to the commercial product name, and the category ID is an identifier to identify the category to which the commercial product belongs. The shop ID is an identifier to identify the shop that sells the commercial product. The commercial product description is information relating to the commercial product and written by the shop in the sales page.

Next, the structure of the information providing device 100 will be explained in more detail.

Figure 2:
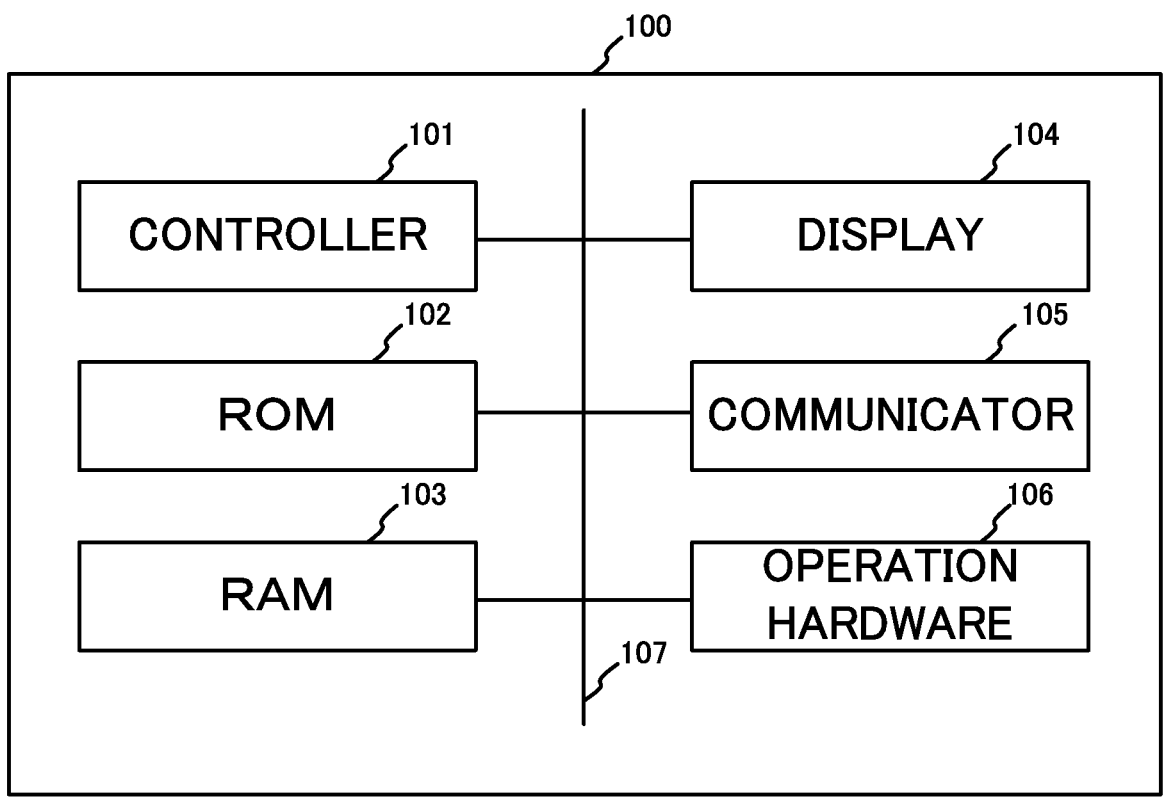
FIG. 2 is a schematic block diagram illustrating a hardware structure of the information providing device.

FIG. 2 is a schematic block diagram illustrating a hardware structure of the information providing device 100. As illustrated in FIG. 2, the information providing device 100 includes a controller 101, a Read Only Memory (ROM) 102, a Random Access Memory (RAM) 103, a display 104, a communicator 105, and an operation hardware 106, and the respective elements are connected one another via a bus 107.

The controller 101 includes, for example, a Central Processing Unit (CPU), and controls the whole information providing device 100.

The ROM 102 is a non-volatile memory that stores a program and various data for the controller 101 to control the whole information providing device 100.

The RAM 103 is a volatile memory that temporarily stores information created by the controller 101, and data necessary to create such information.

The display 104 is a display device that includes an LCD (Liquid Crystal Display), a backlight, and the like. The display 104 displays, for example, data output by the controller 101 under the control thereof.

The communicator 105 includes a communication interface to connect the information providing device 100 to the Internet 500.

The operation hardware 106 includes input devices, such as buttons, a touch panel, and a keyboard. The operation hardware 106 receives an input operation from the customer or the shop, and outputs, to the controller 101, an input operation signal corresponding to the received input operation.

Next, a functional structure of the information providing device 100 will be explained.

Figure 3:
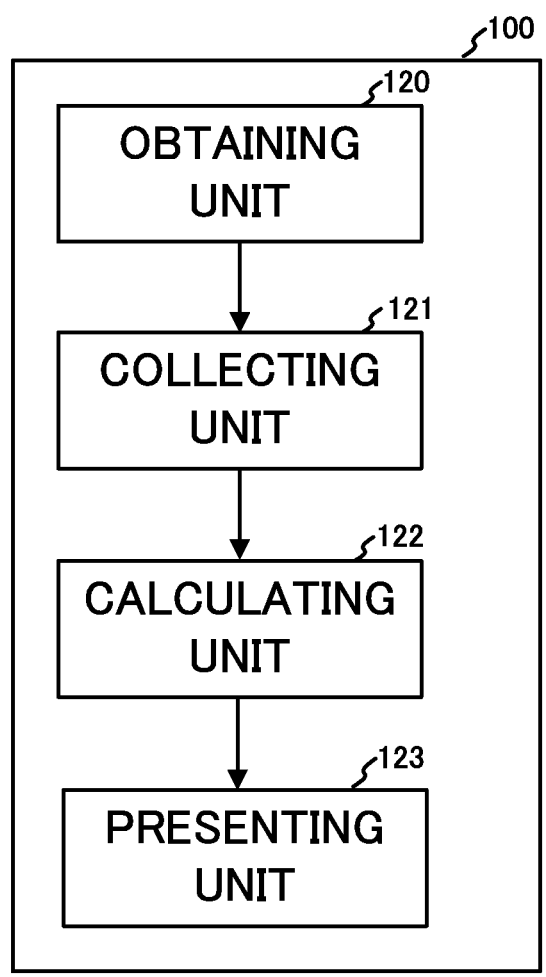
FIG. 3 is a schematic block diagram illustrating a functional structure of the information providing device.

FIG. 3 is a schematic block diagram illustrating a functional structure of the information providing device 100. As illustrated in FIG. 3, the information providing device 100 includes an obtaining unit 120, a collecting unit 121, a calculating unit 122, and a presenting unit 123.

The obtaining unit 120 obtains a ranking that belongs to a category defined on the e-marketplace. The obtainment of the ranking starts when the information providing device 100 creates a purchase table based on the commercial product with a purchase procedure completed. In this case, the e-marketplace is a marketplace that enables a business-to-business transaction over the Internet. In addition, the ranking is obtained for each category defined on the e-marketplace.

Figure 4:
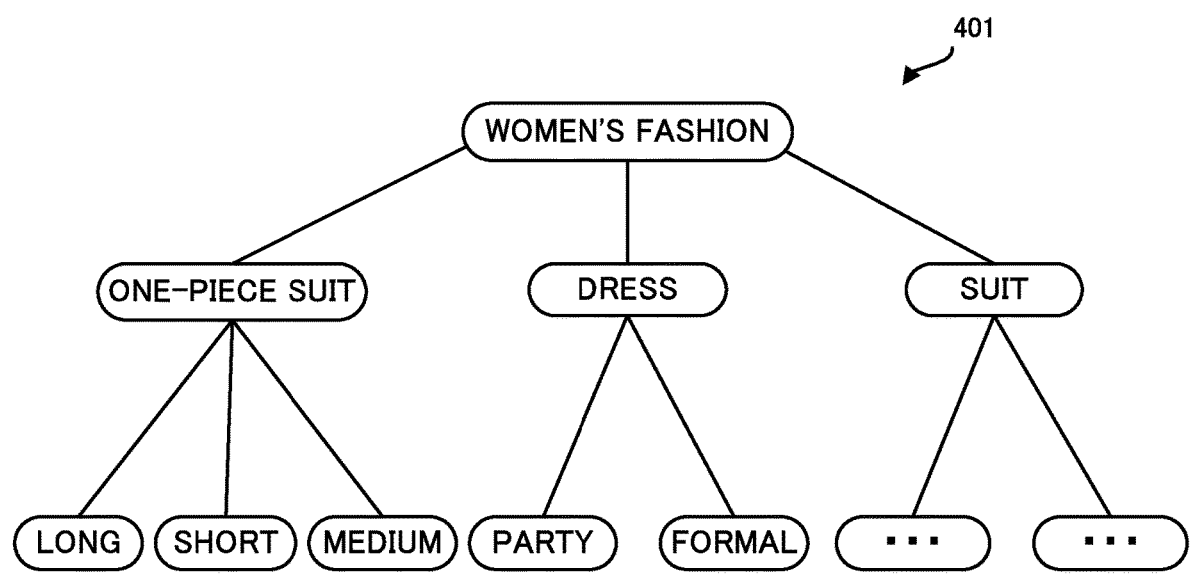
FIG. 4 is a diagram illustrating an example category tree structure.

As for the category structure of the commercial products on the e-marketplace, respective categories may be arranged in a parallel relation one another, or a tree structure in which each category is disposed with a node may be employed. In this embodiment, an explanation will be given of a category structure in which the categories are hierarchically arranged as a tree structure. FIG. 4 is a diagram illustrating an example category structure that is a hierarchical tree structure. A tree structure 401 of the categories illustrated in FIG. 4 is a tree structure for a category that is women's fashion. In this tree structure 401, women's fashion is a parent node that is a root, and this parent node is linked with multiple child nodes that are one-piece suit, dress, and suit with edges. The multiple child nodes are in a brotherhood relationship. Each child node is further linked with grandchild nodes with edges. That is, one-piece suit that is the child node is linked with grandchild nodes that are long, short, and medium with edges, and dress that is the child node is linked with grandchild nodes that are party, formal with edge.

An explanation will be given of a process of obtaining a ranking by the obtaining unit 120 with reference to an example ranking of commercial products belonging to a category that is women's fashion.

A ranking is created upon creation of the purchase table. Hence, a process of creating the purchase table will be explained first. When receiving a search query from the customer, the customer terminal 300 transmits the received search query to the information providing device 100. The controller 101 of the information providing device 100 searches, from the commercial product database 400 based on the received search query, the commercial products containing a letter string that matches the search query, and transmits the searched commercial products to the customer terminal 300. When any one of the searched commercial products is selected by the customer, the customer terminal 300 transmits, to the information providing device 100, information to the effect that the purchase offer to the commercial product is made. The information providing device 100 transmits, to the shop terminal 200, the information to the effect that the purchase offer to the commercial product is made, and the shop terminal 200 starts a procedure for the purchase offer. In the shop terminal 200, after the purchase procedure for the customer completes, information on the purchased commercial product is transmitted to the information providing device 100 from the shop terminal 200, and is stored in the purchase table of the information providing device 100. This process is performed for each customer terminal 300.

Figure 6:
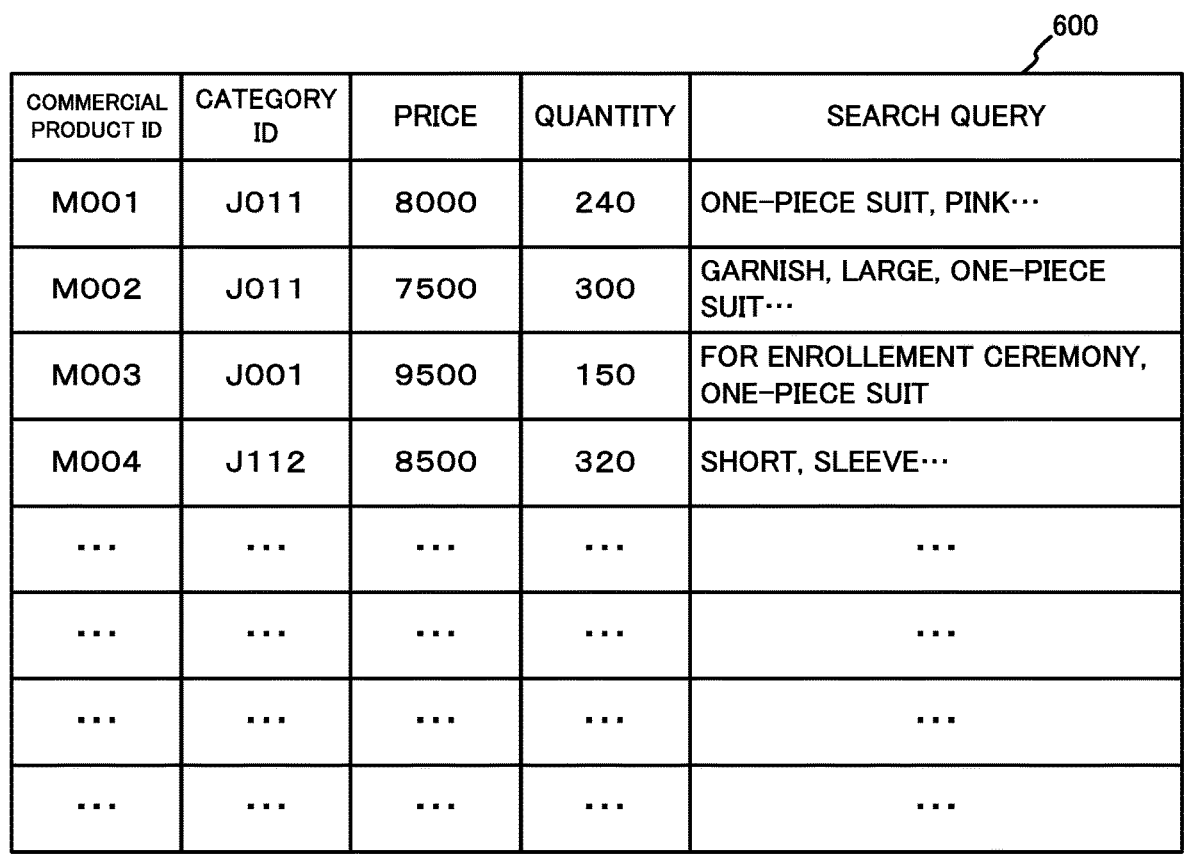
FIG. 6 is a diagram illustrating an example purchase table.

FIG. 6 illustrates an example purchase table 600 stored in the information providing device 100. The purchase table 600 stores a commercial product ID of the commercial product purchased by the customer, a commercial product category ID to which this commercial product belongs, the commercial product price, the purchase quantity purchased within a predetermined time period, and the search query applied to search the commercial product.

Figure 7:
FIG. 7 is a diagram illustrating an example category table.

The commercial product category ID is a reference index for a category classified and defined in accordance with the attribute of the commercial product, and is stored in a category table in association with the category name. FIG. 7 illustrates an example category table 700 showing a correspondence relationship between the category name and the category ID in the category that is women's fashion. A category ID J001 is given to the uppermost layer category in the category structure which is women's fashion, category IDs J011, J012, and J013 are given to the intermediate layer categories that are one-piece suit, dress, and suit, and category IDs J111, J112, J113, J211, and J212 are given to the lowermost layer categories that are long, short, medium, party, and formal.

The category ID stored in the purchase table 600 and the category ID stored in the commercial product database 400 are the consistent category ID. Hence, the commercial product database 400 and the purchase table 600 are tied up by the category ID, and thus, as will be discussed later, when a term relevant to a commercial product in a specific category is collected, textural information stored in both database and table can be collected as the term relevant to the commercial product.

The ranking is determined based on a predetermined time period, and for example, any time period among real time, day by day, week by week, month by month, and year by year is selected by the customer. Accordingly, the time period of the ranking is determined. In a specific category, in accordance with the time period of the ranking selected by the customer, the information providing device 100 creates the purchase table 600, and the obtaining unit 120 obtains the ranking based on the created purchase table 600.

More specifically, the obtaining unit 120 calculates, for each commercial product within the predetermined time period, a total amount of sales, that is, a value obtained by multiplying the sales price by the sales quantity using data in the purchase table 600. Next, the obtaining unit 120 sorts and arranges the commercial products in the order of a higher total amount of sales, and creates a ranking table 800 based on the amount of sales.

Figure 8:
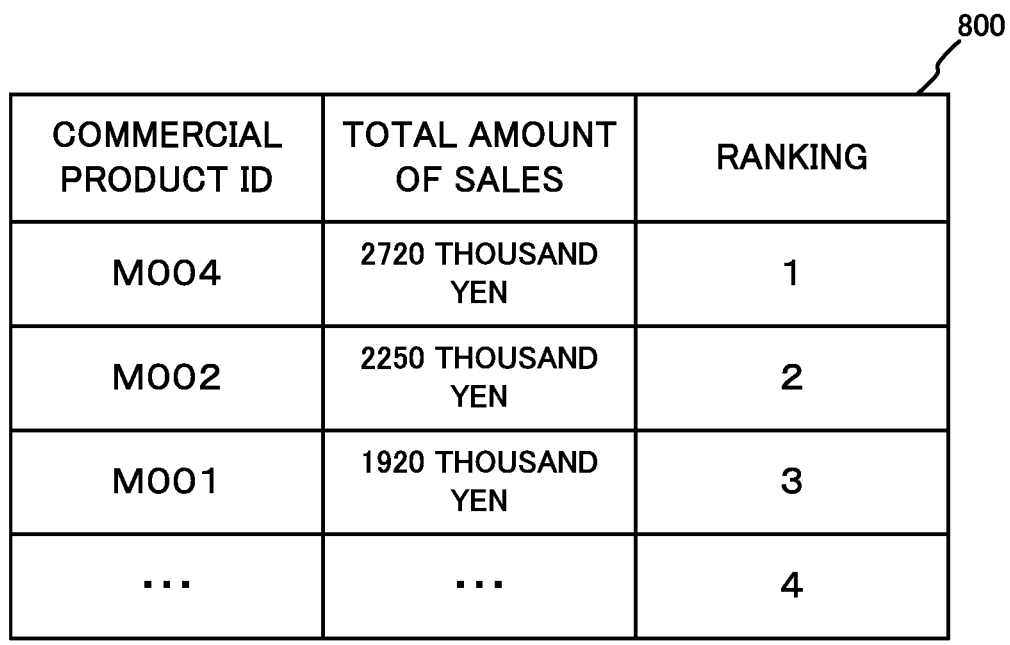
FIG. 8 is a diagram illustrating an example ranking table.

FIG. 8 illustrates an example ranking table 800. The ranking table 800 stores the commercial product ID, a total amount of sales, and a position in the ranking. The ranking table 800 is created for each predetermined category. When the category is structured hierarchically, this table may be created for each uppermost layer category, for each intermediate layer category, or for each lowermost layer category. The ranking table 800 of this embodiment is a ranking table for one-piece suit that is the category J011, and the commercial products are arranged in the order of a higher total amount of sales.

The ranking is not limited to a ranking based on the amount of sales, but may be other kinds of ranking like a ranking of popular commercial products. When a ranking of the popular commercial products is to be obtained, a ranking of the commercial products can be determined based on a table that has a reference index which is the number of popularity votes or the like.

In this embodiment, the controller 101, the communicator 105, and the ROM 102 work together to function as the obtaining unit 120.

The collecting unit 121 collects, from a text contained in a sales page for selling the upper ranking position commercial products or the search query that triggers this sales page to be viewed, a term relevant to the upper ranking position commercial products in the obtained ranking.

An explanation will now be given below of a process of collecting a relevant term to the commercial product by the collecting unit 121 with reference to a process of obtaining a relevant term to the upper-ranking commercial product in the obtained ranking in women's fashion.

First, an explanation will be given of an example case in which a relevant term to the commercial product is collected from a text contained in the sales page for selling the commercial product.

Figure 9:
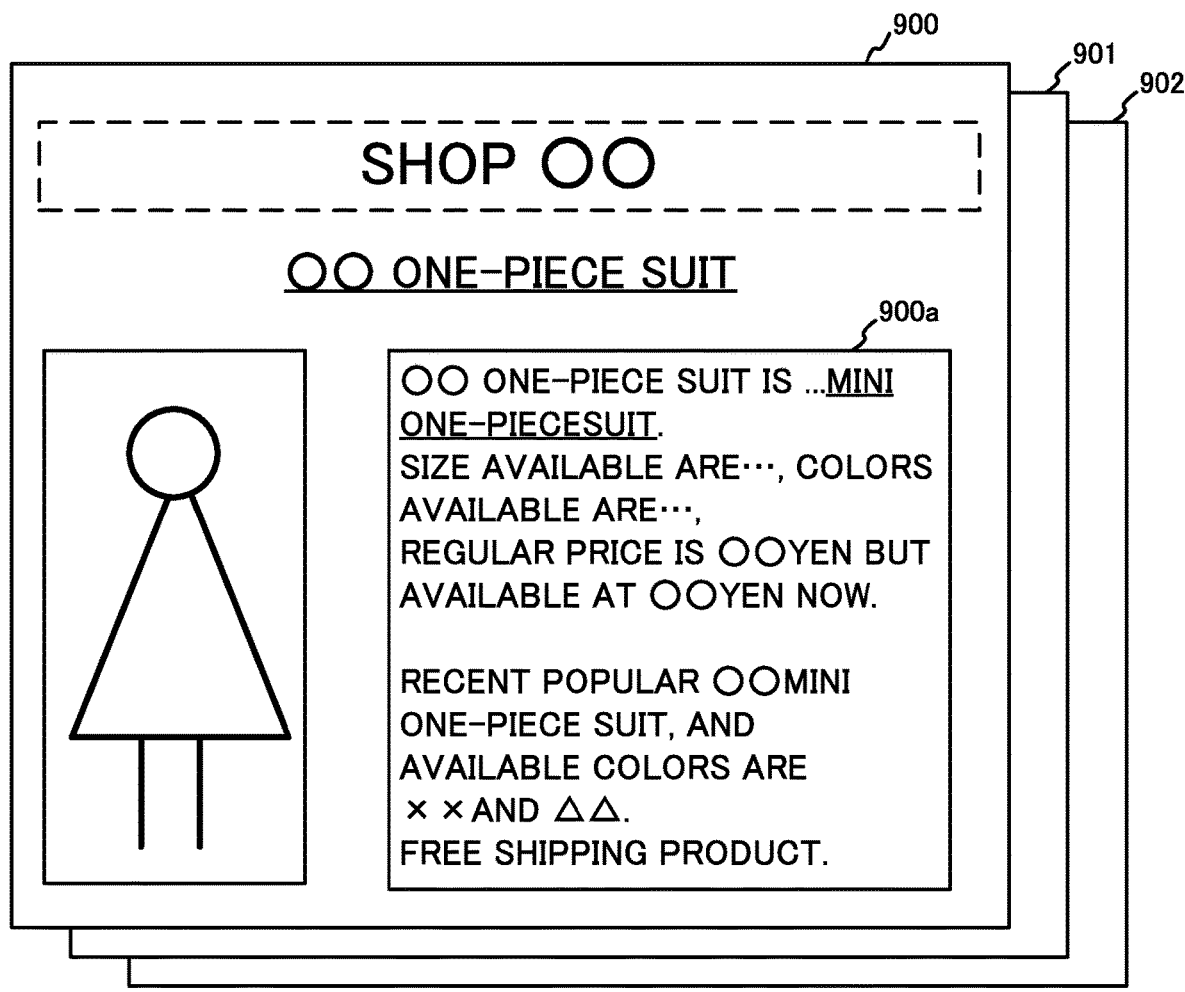
FIG. 9 is a diagram illustrating an example sales page.

The sales page for selling the commercial product is a page to which information on the commercial product that the shop wants to sell is input. Normally, the sales page is created by the shop that inputs commercial product information to the shop terminal 200. FIG. 9 illustrates an example sales page. The sales page 900 contains the shop name of the shop that sells the commercial product, the commercial product name, the commercial product description, and the picture of the commercial product, and the like. Among pieces of information input to the sales page 900, the textural information is transmitted to the information providing device 100 from the shop terminal 200, and is stored in the commercial product database 400. More specifically, the commercial product name and the description of the commercial product that are the textural information in the sales page 900 are stored in the fields of the commercial product database 400 which are the commercial product name and the commercial product description. In addition, the sales page 900 may be linked with the shop terminal 200 when the customer selects the commercial product that the customer wants to purchase through the customer terminal 300, and then the customer may be enabled to view the sales page.

The collecting unit 121 refers to the textural information written in the commercial product description, the commercial product name, and the like in the commercial product database 400 for the upper position commercial product in the ranking obtained by the obtaining unit 120, more specifically, for the commercial product with a ranking position that is equal to or higher than a predetermined position in the ranking table 800, and collects the relevant term to the commercial product with the ranking position that is equal to or higher than the predetermined position.

The relevant term to the commercial product may be terms divided by a minimum unit term. In the case of characters of a language like English that is divided by words, the relevant term becomes a term divided word by word. In the case of characters of a language like Japanese not having a space between words, the minimum unit term may be determined through a scheme like morphological analysis that divides characters into a string of minimum unit terms each have a meaning.

Next, an explanation will be given of collecting a relevant term to the commercial product from the search query that triggers the sales page to be viewed.

When the customer searches a commercial product that the customer wants to purchase, the customer inputs the search query to the customer terminal 300, and the information providing device 100 searches the commercial products relating to the letter string in the search query based on the input search query. When the customer purchases any commercial product among the searched commercial products, the search query corresponding to the purchased commercial product is stored in the search query field in the purchase table 600 illustrated in FIG. 6. The collecting unit 121 refers to the search query in the purchase table 600 tied up by the commercial product ID for the commercial product with the ranking position that is equal to or higher than the predetermined position in the ranking table 800, and collects the relevant term to the commercial product.

The relevant term to the commercial product may be the search query itself or may be a divided term by the minimum unit term as explained above.

Figure 11:
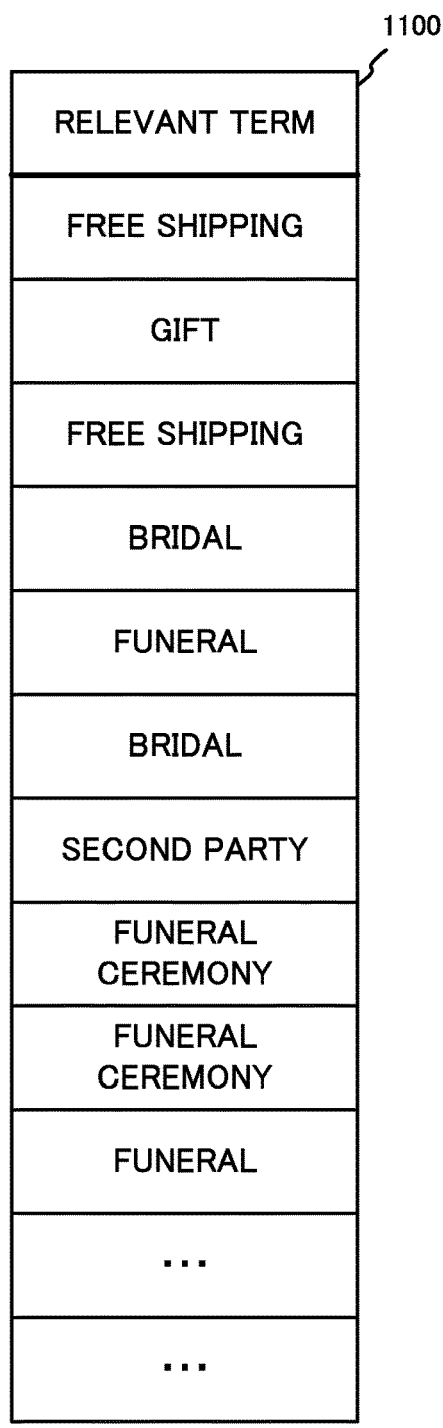
FIG. 11 is a diagram illustrating an example table of a relevant term for another category.

The collected relevant term to the commercial product is stored in a relevant term table for each category. FIG. 10 and FIG. 11 show an example relevant term table collected for each category. FIG. 10 is a table of relevant term to the commercial product collected in the category that is one-piece suit, and FIG. 11 is a table of relevant term to the commercial product collected in the category that is dress.

In this embodiment, the controller 101, the communicator 105, and the ROM 102 work together to function as the collecting unit 121.

The calculating unit 122 calculates the score of each collected term based on at least the number of collections of such a term.

An explanation will be given of a process of calculating the score of the collected term based on the number of collections by the calculating unit 122 with reference to an example process of calculating the store based on the collected term in the category that is one-piece suit and in the category that is dress. In this case, the number of collections is, for example, the number of appearances of the relevant term to the commercial product or the number of appearances of the sales page that shows the relevant term to the commercial product.

Figure 13:
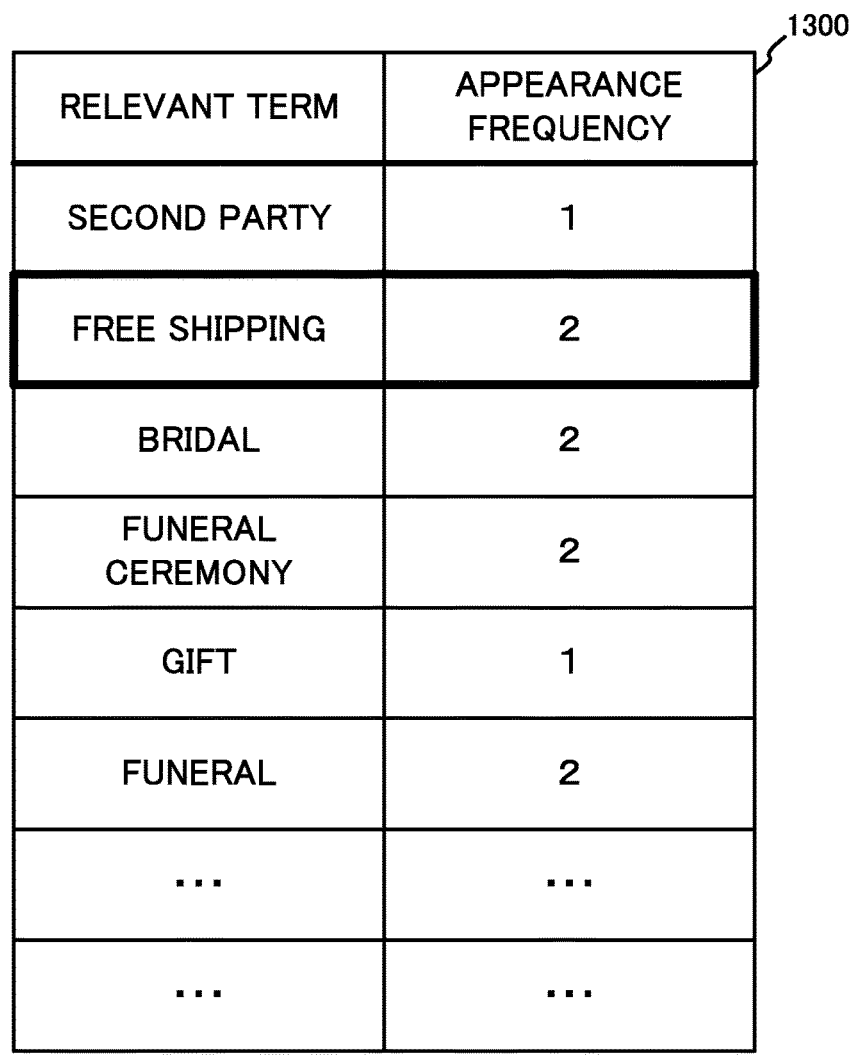
FIG. 13 is a diagram illustrating another example table of appearance frequency of a relevant term.

When the number of collections is the number of appearances of the relevant term to the commercial product, the score of such a term is obtained as an appearance frequency indicating how many times the relevant term to the commercial product appears within a predetermined time period, for example, real time, day by day, week by week, month by month, and year by year. FIG. 12 and FIG. 13 illustrate an example appearance frequency table of the relevant term. FIG. 12 is a table showing the appearance frequency of the relevant term in the category that is one-piece suit, and FIG. 13 is a table showing the appearance frequency of the relevant term in the category that is dress. The larger the number of appearances of the relevant term to the commercial product is, the larger the score of the appearance frequency becomes.

For example, as for the appearance frequency of the relevant term in the category that is one-piece suit is, as illustrated in FIG. 12, the number of appearances within the predetermined time period is indicated as the score that is the appearance frequency for each relevant term, and the score of the appearance frequency is 2 for "gift", 2 for "free shipping", 3 for "mini one-piece suit", 2 for "mini spring one-piece suit", and 1 for "long sleeve". In addition, the score of the appearance frequency of the relevant term in the category that is dress is, as illustrated in FIG. 13, 1 for "second party", 2 for "free shipping", 2 for "bridal", 2 for "funeral ceremony", 1 for "gift", and 2 for "funeral".

When the number of collections is the number of the appearance frequency of the sales page that shows the relevant term to the commercial product, the score is determined based on how many sales pages created by the shop and showing the relevant term to the commercial product is collected within the predetermined time period. The sales page is normally created shop by shop that sells the commercial product, but the multiple sales pages may be created by the same shop.

For example, the score is determined based on how many pages the sales page appears within the predetermined time period for the commercial product with the ranking position that is equal to or higher than the predetermined position. In the sales page 900 illustrated in FIG. 9, the relevant term "mini one-piece suit" to the commercial product appears. When the term "mini one-piece suit" appears in the other sales pages, for example, a sales page 901, and a sales page 902, the number of appearances of the term "mini one-piece suit" is 3. The calculating unit 122 calculates the number of collections as 3. Note that the term "mini one-piece suit" appears twice in the sales page 900, but is counted as 1 for this single sales page.

In this embodiment, the controller 101 and the communicator 105 work together to function as the calculating unit 122.

The presenting unit 123 presents, as a suggested keyword for commercial product search refinement belong to the category, the term with the calculated score at the upper ranking position.

An explanation will now be given of a process of presenting the suggested keyword for search refinement by the presenting unit 123 with reference to an example process of presenting the suggested keyword for the category that is one-piece suit and for the category that is dress.

The presenting unit 123 presents, as the suggested keyword for commercial product search refinement, the relevant term with the appearance frequency that is at an upper position among the relevant terms. For example, in the appearance frequency table of the relevant term illustrated in FIG. 12, as for the appearance frequency of the relevant term, the appearance frequency increases in the order of "long sleeve"→"gift", "free shipping", "mini spring one-piece suit"→"mini one-piece suit". Hence, the presenting unit 123 presents, to the customer terminal 300, the relevant term with the appearance frequency that is equal to or greater than, for example, 2 as the suggested keyword for commercial product search refinement.

The presenting unit 123 presents, as the suggested keyword for commercial product search refinement, the relevant term with the appearance frequency that is at the upper position among the relevant terms. For example, in the appearance frequency table of the relevant term illustrated in FIG. 13, as for the appearance frequency of the relevant term, the appearance frequency increases in the order of "second party", "gift"→"free shipping", "bridal", "funeral ceremony", and "funeral". Hence, the presenting unit 123 presents, to the customer terminal 300, the relevant term with the appearance frequency that is equal to or greater than, for example, 2 as the suggested keyword for commercial product search refinement.

Figure 14:
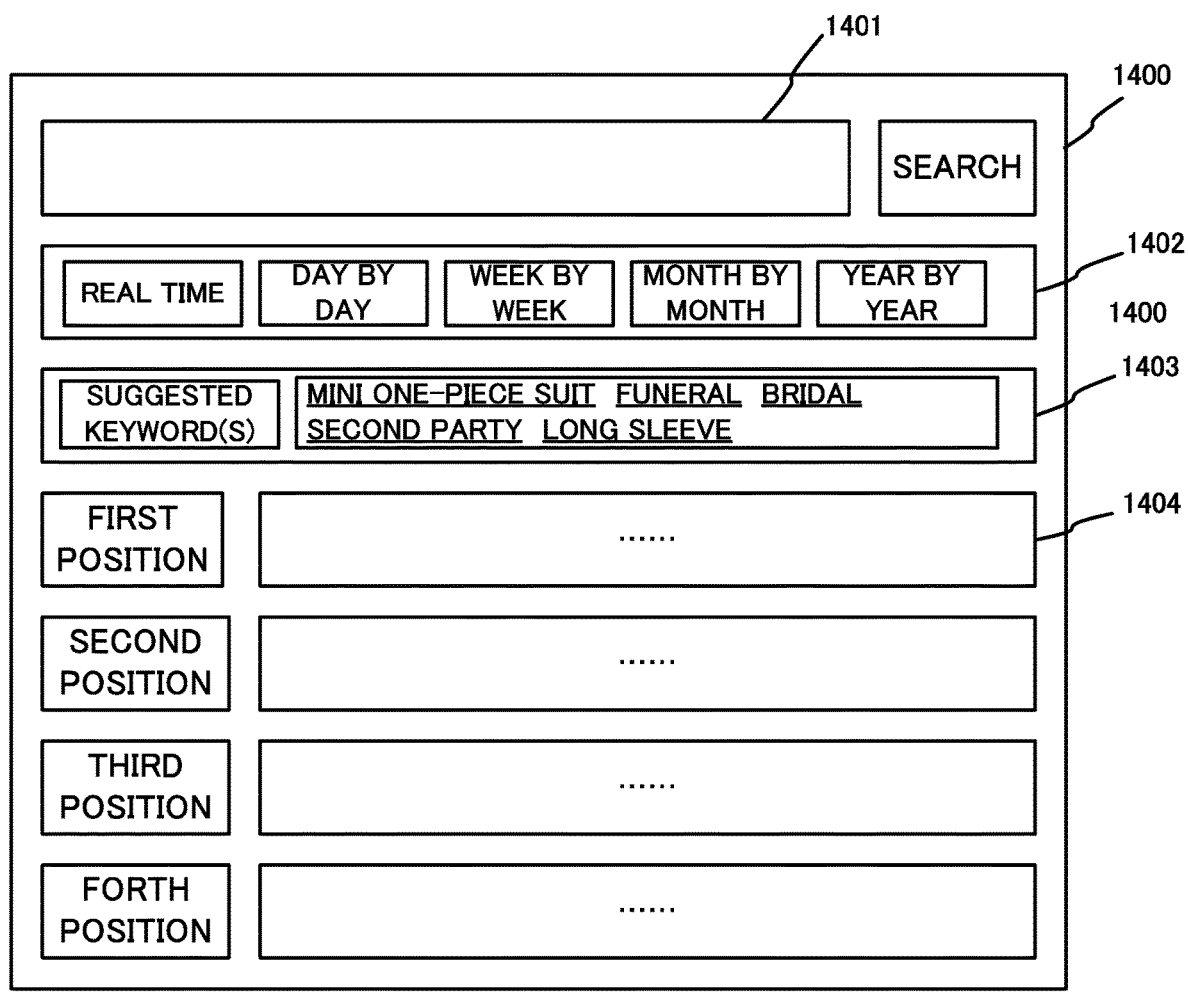
FIG. 14 is a diagram illustrating an example ranking page.

More specifically, the presenting unit 123 provides the suggested keyword as a part of a ranking page on the display of the customer terminal 300. FIG. 14 illustrates an example ranking page 1400 containing the suggested keyword and displayed on the display of the customer terminal 300. The ranking page 1400 contains a search query input part 1401, a ranking time period display part 1402, a suggested keyword display part 1403, and a ranking display part 1404. The search query input part 1401 is a field to input the query desired by the customer for searching, the ranking time period display part 1402 is a part to display a target time period to create the ranking, the suggested keyword display part 1403 is a part to display the suggested keyword for commercial product search refinement, and the ranking display part 1404 is a part to display the ranking of obtained based on the search query input by the customer and obtained by the obtaining unit 120.

When the customer views the ranking result displayed at the ranking display part 1404, and wants to perform commercial product search refinement, the customer refers to the suggested keyword displayed at the suggested keyword display part 1403. When the customer attempts to perform commercial product search refinement based on the displayed suggested keyword, the customer inputs the suggested keyword or the suggested keyword and an additional keyword to the search query input part 1401. The information providing device 100 performs searching again based on the input suggested keyword and the additional keyword, and displays the search result on the display of the customer terminal 300. In addition, the information providing device 100 may automatically perform search refinement when the customer selects any one of the suggested keywords displayed at the suggested keyword display part 1403, not when the keyword is input to the search query input part 1401 for search refinement.

Note that the presenting unit 123 presents, as the suggested keyword, the term with the calculated score that is at an upper ranking position, but the "upper ranking position term" is not limited to the one with the appearance frequency that is equal to or higher than the predetermined value like this embodiment. When, for example, among the relevant terms arranged in the order of the higher appearance frequency, the relevant terms with a ranking that is equal to or higher than a predetermined position may be taken as the upper ranking position terms. In addition, the upper ranking position term may be a term that has the appearance frequency as a predetermined relevant term at a total of equal to or greater than 60% as a whole.

In this embodiment, the controller 101 and the communicator 105 work together to function as the presenting unit 123.

Next, an explanation will be given of an operation of the information providing device 100 of this embodiment.

Figure 15:
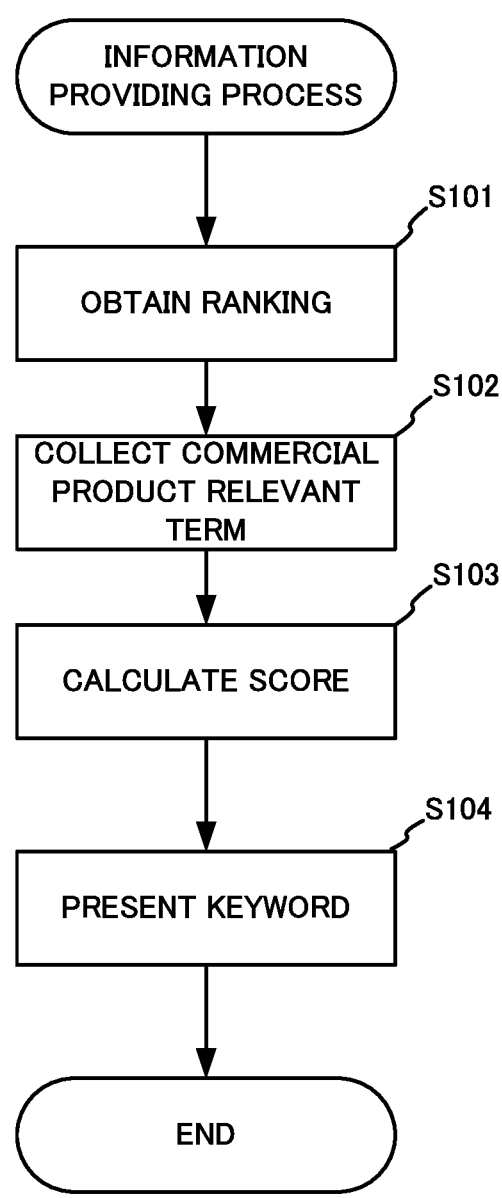
FIG. 15 is an example flowchart of an information providing process.

An information providing process executed by the controller 101 of the information providing device 100 will be explained. FIG. 15 is a flowchart of an example information providing process. The information providing process illustrated in FIG. 15 starts upon receiving, for example, an inputting of a request to the ranking page 1400 of the commercial products from the customer terminal 300. In addition, this process is executed by the controller 101 that reads the program stored in the ROM 102.

When receiving an inputting of a request to the commercial product ranking page 1400 from the customer terminal 300, the obtaining unit 120 refers to the purchase table 600, and obtains the ranking of the commercial products (step S101). The obtaining unit 120 refers to, in accordance with to what category of commercial product the ranking request from the customer terminal 300 corresponds, the purchase table 600 in accordance with that category. In addition, the obtaining unit 120 refers to the purchase table 600, in accordance with to what ranking period, that is, real time, day by day, week by week, month by month, and year by year, the ranking request from the customer terminal 300 corresponds.

Next, the collecting unit 121 collects the relevant terms to the commercial product for the upper ranking position commercial product obtained by the obtaining unit 120 (step S102). The relevant term to the commercial product is collected from the terms contained in the sales page 900 created by the shop or from the search query input by the customer.

Subsequently, for each relevant term to the commercial product collected by the collecting unit 121, the calculating unit 122 calculates the score of the term based on the number of collections of this term (step S103).

Next, the presenting unit 123 displays, on the display of the customer terminal 300, the term with the upper ranking score among the scores of the terms calculated by the calculating unit 122 as the suggested keyword for commercial product search refinement (step S104). Subsequently, the process is finished.

As explained above, the information providing device 100 of this embodiment obtains the relevant terms to the commercial products at the upper positions in the commercial product ranking, and calculates the score based on the number of obtainments of such a term. Next, the term with the calculated score that is at an upper position can be presented as the suggested keyword for commercial product search refinement. Therefore, the customer can obtain the relevant term to the commercial product at the upper ranking position as the suggested keyword, and thus there is an advantage such that the customer can easily search a recommended commercial product at the upper position in the ranking by a search refinement based on the suggested keyword presented to the customer.

The embodiment of the present disclosure was explained above, but the present disclosure is not limited to this embodiment. Modified examples of the embodiment will be explained below. In the following modified examples, the same structure as that of the above embodiment will be denoted by the same reference numeral, and the detailed explanation thereof will be omitted.

First Modified Example of First Embodiment

In the above first embodiment, the calculating unit 122 calculates, based on the number of collections of the term, for a specific category, the score of the collected term. However, the calculating unit 122 can have a further limited calculation method of the score. For example, the score may be defined based on a value obtained by decreasing the number of collections of a specific term in a first category by the number of collections of such specific term in a second category.

An explanation will be given below with reference to the relevant term appearance frequency table illustrated in FIG. 12 and for the category that is one-piece suit, and to the relevant term appearance frequency table illustrated in FIG. 13 and for the category that is dress. A specific term "free shipping" in a first category that is one-piece suit also appears in a second category that is dress. When the same term appears in multiple categories in this way, such a term is highly possibly a generic name or an industry term rather than a unique term to such a category. Hence, when there is such a term, it is necessary to decrease the score of such a term. In this modified example, the term "free shipping" appears in the category that is one-piece suit and in the category that is dress. Accordingly, the number of appearance frequency of the term "free shipping" in the category that is one-piece suit is decreased based on the appearance frequency of the term "free shipping" in the category that is dress.

Possible methods to decrease the score are a method of simply subtracting the number of the appearance frequency of the term in the second category from the appearance frequency of the term in the first category, a method of multiplying a coefficient in accordance with the appearance frequency in the second category, and subtracting from the number of appearance frequency in the first category, and a method of subtracting a certain number from the number of appearance frequency in the first category when the term also appears in the second category.

By employing such a structure, it is determined whether or not the collected relevant term to the commercial product is a unique term in the category to which such a term belongs, and thus the appropriate suggested keyword for commercial product search refinement can be extracted.

Second Modified Example of First Embodiment

In the above first modified example of the first embodiment, the calculating unit 122 defined the number of collections of the specific term in the first category based on the value decreased on the basis of the number of collections of the specific term in the second category. However, the degree of decreasing the value can be further limited. When, for example, the similarity between the first category and the second category is high, the decrease degree may be reduced.

When the similarity between the categories is high, the term to be collected as the relevant term to the commercial product is common, and the number of collections of such a term increases. Hence, such a term is highly possibly a specific term to those categories. Conversely, when the similarity between the categories is low, the term to be collected as the relevant term to the commercial product is usually not so common. When the term to be collected between categories is common and the number of collections of such a term is high, such a term is highly possible a generic name or a common term. Therefore, it is preferable that the degree of decreasing the score of the term should be set to be low when the similarity between the categories is high.

An explanation will be given with reference to the relevant term appearance frequency table illustrated in FIG. 12 and for the category that is one-piece suit, and to the relevant term appearance frequency table illustrated in FIG. 13 and for the category that is dress. A specific term "gift" in the first category that is one-piece suit also appears in the second category that is dress. Next, the category that is one-piece suit and the category that is dress are both the child categories of the parent category that is women's fashion, and thus both categories are highly possibly similar Hence, when there is such a term, and the score of such a term is to be decreased, it is necessary to reduce the amount of decrease. In addition, it is presumed that, for example, a term "long sleeve" in the category that is one-piece suit also appears in the category that is dress shirt in men's fashion. In this case, the parent category of the category that is one-piece suit is women's fashion, and the parent category of the category that is dress shirt is men's fashion. Hence, the similarity between both categories is lower than the similarity between the category that is one-piece suit and the category that is dress. Accordingly, when the score of the term is decreased, the amount of decrease is increased.

By employing such a structure, when the score of the collected term is calculated, it is determined whether or not, in consideration of the similarity between a given category to which the collected relevant term to the commercial product belongs and the other category where such a term also appears, the term is a specific term to the given category, and thus the suggested keyword appropriate for commercial product search refinement can be extracted.

Third Modified Example of First Embodiment

In the above second modified example of the first embodiment, the calculating unit 122 defines the number of collections of the specific term in the first category based on the value decreased on the basis of the number of collections of the specific term in the second category, and when the similarity between the first category and the second category is high, the degree of decrease is reduced. However, as for the method of determining the similarity, the other method is also applicable. When, for example, the category hierarchy is defined based on a tree structure that has each category disposed at a node, and when a given category in the tree structure and the other category therein are brotherhood nodes, the similarity between the given category and the other category can be determined as high.

More specifically, an explanation will be given with reference to the category tree structure 401 illustrated in FIG. 4. As explained above, the tree structure 401 in FIG. 4 is a tree structure for the category that is women's fashion, and has the node that is women's fashion as the root. This root has multiple child nodes that are one-piece suit, dress, and suit linked one another with edges. In this tree structure 401, the relationship among the one-piece suit, dress, and suit satisfy the brotherhood relationship. In addition, the relationship among long, short, and medium in the category that is one-piece suit satisfy the brotherhood relationship. It can be determined that the similarity is high between those categories with the brotherhood relationship, and the decree of decreasing the score is reduced.

By employing such a structure, when the score of the collected term is calculated, it is determined whether or not, in consideration of the node relationship between a given category to which the collected relevant term to the commercial product belongs and the other category where such a term also appears, the term is a specific term to the given category, and thus the suggested keyword appropriate for commercial product search refinement can be extracted.

Fourth Modified Example of First Embodiment

In the above second modified example of the first embodiment, the calculating unit 122 defines the number of collections of the specific term in the first category based on the value decreased on the basis of the number of collections of the specific term in the second category, and when the similarity between the first category and the second category is high, the degree of decrease is reduced. However, as for the method of determining the similarity, the other method is also applicable. When, for example, the category hierarchy is defined based on a tree structure that has each category disposed at a node, and when a distance between a given category and the other category is short, it can be determined that the similarity between the given category and the other category is high.

An explanation will be given below with reference to the category tree structure 401 illustrated in FIG. 4. As explained above, the tree structure 401 in FIG. 4 is a tree structure for the category that is women's fashion. In the tree structure 401, from the child category that is long of the category that is one-piece suit to the child category that is medium of one-piece suit, it is necessary to pass through two edges that are long→one-piece suit→medium. Hence, the distance from long to medium can be calculated as the distance equivalent to the two edges. Conversely, from the child category that is long of the category that is one-piece suit to the child category that is party of dress, it is necessary to pass through four edges that are long→one-piece suit→women's fashion→dress→party. As explained above, the distance from the category which is long and is the child category of one-piece suit to the category that is medium is shorter than the distance from the category which is long and is the child category of one-piece suit to the child category that is party of dress. Hence, the similarity between the category that is long and the category that is medium can be determined as higher than the similarity between the category that is long and the category that is party. Next, the degree of decreasing the score is reduced.

By employing such a structure, when the score of the collected term is calculated, it is determined whether or not, in consideration of the distance from a given category to which the collected relevant term to the commercial product belongs to the other category where such a term also appears, the term is a specific term to the given category, and thus the suggested keyword appropriate for commercial product search refinement can be extracted.

Fifth Modified Example of First Embodiment

In the above first embodiment, the obtaining unit 120 obtains the ranking of the commercial products belonging to a specific category in the e-marketplace. However, the obtainment of the commercial product ranking can be further limited in consideration of the relationship between the commercial product and the shop that sells the commercial product. For example, in the sales pages created by the multiple shops, when the same commercial product belonging to the same category is sold, regardless of the consistency/inconsistency of the shop, the ranking may be obtained for each category where the sold commercial product belongs.

In the e-marketplace, since commercial product names are created by the shops, the same commercial product belonging to the same category is often available from the multiple shops with different commercial product names. In this case, the information providing device 100 creates the purchase table 600 with those commercial products being as different commercial products, and the obtaining unit 120 obtains the ranking from this purchase table 600 created in this way. Hence, many commercial products are on sale although such commercial products are the same commercial product in practice, and such commercial products are taken as the commercial product at the lower position in the ranking even if the large number of such a commercial product has been sold.

In order to avoid this inconvenience, this modified example is applied. More specifically, in the commercial product database 400, for the same commercial product available in the same category, for example, a commercial product code is additionally given to handle those commercial products as the same commercial product. When, for example, in the commercial product database 400, the multiple commercial products that are "A-line one-piece suit" and the "frilly one-piece suit" belonging to the same category (J011) are given with the same commercial product code, those commercial products are taken as the same commercial product. Hence, the commercial product with the commercial product ID "M0001" in the purchase table 600 and the commercial product with the commercial product ID "M0002" therein are taken as the same commercial product, and when the obtaining unit 120 creates the ranking table 800, the total amount of sales is combined and calculated. Hence, the ranking in the ranking table in FIG. 8, in general, the first position is the commercial product M004, the second position is the commercial product M002, and the third position is the commercial product M001. According to this modified example, however, the first position becomes a commercial product group including M001 and M002, and the second position is the commercial product M004.

By employing such a structure, even if the multiple shops are separately selling the same commercial product, it is possible to present the suggested keyword of the relevant term to the commercial product with reference to the ranking based on the same commercial product. Hence, the customer can view, as the suggested keyword, the search term with a larger appearance frequency regardless of the shops that are the sources of the commercial product, and can perform effective search refinement.

Second Embodiment

Next, an explanation will be given of a second embodiment. In the first embodiment, the score of the relevant term to the commercial product is calculated based on the number of collections of the term, and the suggested keyword for commercial product search refinement is determined. In this embodiment, as for the calculation of the score, the number of collections of the term is multiplied by a contrary category frequency, and the score is determined.

The contrary category frequency is a reference index indicating the rate of the appearance frequency of the term in accordance with the number of categories, and the larger the number of categories where the term appears is, the smaller the contrary category frequency becomes. The contrary category frequency can be expressed as the following formula.

Contrary category frequency=log(number of child categories/number of appearing child categories)

Figure 16:
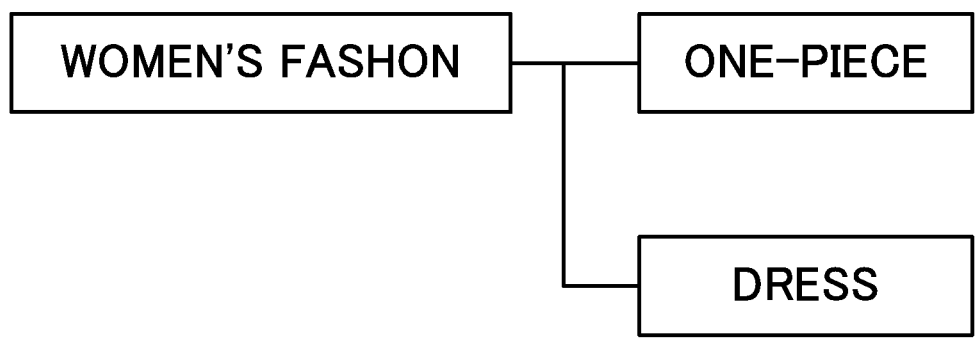
FIG. 16 is a diagram illustrating an example tree structure for women's fashion.

The calculation of the score using the contrary category frequency is applicable to the category hierarchy that is a tree structure with multiple categories disposed at nodes. In general, the category hierarchy expressed by the tree structure is the category hierarchy with the tree structure 401 illustrated in FIG. 4, but in this embodiment, in order to facilitate understanding to the present disclosure, an explanation will be given based on a simpler category hierarchy illustrated in FIG. 16.

More specifically, in the category hierarchy of the tree structure with the multiple categories disposed at nodes, the calculating unit 122 calculates the appearance frequency of the relevant term in the child category and in the parent category, and the contrary category frequency is calculated based on the calculated appearance frequency. For example, in the parent category that is women's fashion in FIG. 16, and in the category hierarchy where nodes of child categories that are one-piece suit and dress are disposed, the appearance frequency of the relevant term for one-piece suit is illustrated in FIG. 12 and the appearance frequency of the relevant term for dress is illustrated in FIG. 13. Based on the appearance frequency of the relevant term illustrated in such figures, the calculating unit 122 obtains the appearance frequency of the relevant term in women's fashion. FIG. 17 is a table showing an example appearance frequency of the relevant term in women's fashion.

The calculating unit 122 obtains the contrary category frequency based on the appearance frequency of the relevant term illustrated in FIG. 17. FIG. 18 illustrates an example table showing a relationship between the relevant term and the contrary category frequency. The table illustrated in FIG. 18 and showing the relationship between the relevant term and the contrary category frequency includes the fields that are the relevant term, the appearance frequency of the relevant term, the number of child categories, the number of categories where the term appears, and the contrary category frequency. The values of the appearance frequency, number of child categories, and number of categories where the term appears are substituted in the above formula to obtain the contrary category frequency. For example, as illustrated in FIG. 18, the calculating unit 122 calculates, by applying the above formula, the contrary category frequency of the relevant term as "0" for "free shipping" and "gift", and as "0.301" for other relevant terms. When the number of categories where the term appears is zero, the contrary category frequency is set to be, for example, 1, and the calculation is performed.

Next, the calculating unit 122 calculates the weighting of each relevant term based on the product of the obtained contrary category frequency by the appearance frequency. FIG. 19 illustrates an example table for weighting calculated for each relevant term. The weighting table includes the relevant term, the appearance frequency, the contrary category frequency, and the weighting value obtained by the appearance frequency×contrary category frequency. The presenting unit 123 presents, to the customer terminal 300, the term with the upper position weighting value among the weighting values calculated in this way as the suggested keyword for commercial product search refinement.

When there are multiple terms which have the same meaning but have different notation, those terms can be processed as the same relevant term. More specifically, when a similarity between a word X and a word Y is smaller than a threshold k, the calculating unit 122 processes that the word X and the word Y has the same meaning. As for the multiple terms recognized as the same term, a representative term is taken as the same term. For example, the term "funeral ceremony" and the term "funeral" are taken as the same relevant terms as the similarity is smaller than the threshold k, and the term "funeral" is taken as the representative term.

As explained above, for the term relevant to the commercial product and presented as the keyword for commercial product search refinement, after the presenting unit 123 obtains the terms with the number of appearance frequency at the higher ranking position, the ranking position is changed based on the contrary category frequency, and similar terms can be further collected as a single representative term. Through such procedures, a highly accurate suggested keyword for commercial product search refinement can be presented.

FIGS. 20A to 20C are diagrams illustrating how the suggested keywords for commercial product search refinement are narrowed down. FIG. 20A is a diagram illustrating a table that arranges the relevant terms to the commercial products in the order of the appearance frequency in the category that is women's fashion, FIG. 20B is a diagram illustrating a table that changes the arrangement of the relevant terms to the commercial products with weighting based on the contrary category frequency, and FIG. 20C is a diagram illustrating a table showing the similar terms collected as a term for the relevant terms to the commercial products. As illustrated in FIG. 20A and FIG. 20B, the relevant term that is "free shipping" is arranged with the appearance frequency being as the first ranking position, but after the weighting based on the contrary category frequency, this term is located at the lower ranking position. In addition, "funeral ceremony" and "funeral" are recognized as the same word, and are collectively displayed by the representative term that is "funeral". Eventually, as illustrated in FIG. 20C, the terms not specific to this category are once arranged to the lower ranking positions, and the multiple terms with the same meaning are collectively displayed as a single term.

By employing such a structure, the multiple relevant terms to the commercial product in a given category are narrowed down to the specific term to such a category based on the contrary category frequency, and the terms with the similar meaning are collected up by a representative term. Hence, a further precise suggested keyword can be presented to the customer, and the customer can apply such a suggested keyword for search refinement.

In the above embodiments, the program to be executed by the information providing device 100 may be stored in a non-transitory computer-readable recording medium, such as a flexible disk, a Compact Disk Read-Only Memory (CD-ROM), a Digital Versatile Disk (DVD), or an Magneto to Optical Disk (MO) and distributed. Next, by installing such a program to an information processing device like a personal computer to realize the information providing device 100 that executes the above process.

In addition, when the above functions are realized and shared by an Operating System (OS) or by a cooperative work of the OS with an application, only a program other than a portion that realizes the functions of the OS may be stored in a non-transitory recording medium and distributed or may be downloaded.

Preferred embodiments of the present disclosure were explained above, but the present disclosure is not limited to the specific embodiment, and various changes and modifications can be made within the scope of the appended claims.

In addition, the above embodiments are to explain the present disclosure, and are not intended to limit the scope of the present disclosure. That is, the scope of the present disclosure is indicated by the appended claims rather than the embodiments. In addition, various modifications carried out within the appended claims and the equivalent range thereto should be determined as being within the scope of the present disclosure.

INDUSTRIAL APPLICABILITY

The present disclosure is suitable for e-commerce that utilizes a network like the Internet.

REFERENCE SIGNS LIST

1 Information providing system
100 Information providing device
101 Controller
102 ROM
103 RAM
104 Display
105 Communicator
106 Operation hardware 107 Bus
120 Obtaining unit
121 Collecting unit
122 Calculating unit
123 Presenting unit
200 Shop terminal
300 Customer terminal
400 Commercial product database
401 Tree structure
500 Internet
600 Purchase table
700 Category table
800 Ranking table
900-902 Sales page
900a Commercial product description display part
1000 Relevant term table
1100 Relevant term table
1200 Relevant term appearance frequency table
1300 Relevant term appearance frequency table
1400 Ranking table
1401 Search query input part
1402 Ranking time period display part
1403 Suggested keyword display part
1404 Ranking display part
1700 Relevant term appearance frequency table

The invention claimed is:

1. An information providing device comprising:
a communication interface;
at least one memory configured to store computer program code; and
at least one processor configured to access the at least one memory and operate as instructed by the computer program code, the computer program code configure to cause the at least one processor to perform operations comprising:
receive, from a user terminal via the communication interface, a search query;
obtain a ranking of a plurality of objects belonging to a category corresponding to the search query;
collect a plurality of terms relevant to an object that is ranked at an upper position in the obtained ranking, each of the plurality of terms corresponding to at least one from among a text contained in a web page for the object and a search query that triggers the web page to be viewed;
identify a weighting value of each of the plurality of terms;
present to the user terminal via the communication interface (i) search results corresponding to the search query and (ii) a term that is ranked at an upper ranking position of the plurality of terms according to the weighting value of each of the plurality of terms, the term presented as a suggested keyword for search refinement of the object belonging to the category, the suggested keyword rendered within the communication interface as a selectable interface element configured to automatically trigger search refinement upon selection;
receive, from the user terminal via the communication interface, a selection of the suggested keyword by receiving a selection of the selectable interface element;
responsive to receiving the selection of the selectable interface element, automatically trigger refining the search results based on the search query and the suggested keyword;
in response to the automatically triggered search refinement, automatically present an updated communication interface to the user, the updated communication interface comprising refined search results corresponding to the search query and the suggested keyword,
wherein the plurality of objects belonging to the category are hierarchically arranged in a tree structure with each category disposed at a node; and
wherein the weighting value of each of the plurality of terms is defined based on:
(a) an appearance frequency of a corresponding term; and
(b) a contrary category frequency defined by a number of child categories of the category, and a number of child categories where the corresponding term is collected among the child categories.

2. The information providing device according to claim 1, wherein the web page is one from among a plurality of web pages respectively corresponding to a plurality of shops,
wherein the object belonging to the category is available from each of the plurality of web pages, and
wherein the ranking is obtained for each category to which the object belongs regardless of which of the plurality of shops the object is provided.

3. The information providing device according to claim 1, wherein the user terminal is connected to the information providing device via a network.

4. The information providing device according to claim 1, wherein the search results comprise at least two of the plurality of objects belonging to the category.

5. The information providing device according to claim 1, wherein the weighting value of each of the plurality of terms is defined based on a product of:
(a) the appearance frequency of the corresponding term; and
(b) the contrary category frequency defined by the number of child categories of the category, and the number of child categories where the corresponding term is collected among the child categories.

6. An information providing method executed by an information providing device including a communication interface and at least one processor, the method comprising:
receiving, via the communication interface and under control of the at least one processor, a search query from a user terminal;
obtaining, by the at least one processor, a ranking of a plurality of objects belonging to a category corresponding to the search query;
collecting, by the at least one processor, a plurality of terms relevant to an object that is ranked at an upper position in the obtained ranking, each of the plurality of terms corresponding to at least one from among a text contained in a web page for the object and a search query that triggers the web page to be viewed;
identifying, by the at least one processor, a weighting value of each of the plurality of terms;
presenting, via the communication interface and under control of the at least one processor, (i) search results corresponding to the search query, and (ii) a term that is ranked at an upper ranking position of the plurality of terms according to the weighting value of each of the plurality of terms, the term presented as a suggested keyword for search refinement of the object belonging to the category, the suggested keyword rendered within the communication interface as a selectable interface element configured to automatically trigger search refinement upon selection;
receiving, from the user terminal via the communication interface and under control of the at least one processor, a selection of the suggested keyword by receiving a selection of the selectable interface element;

in response to receiving the selection of the selectable interface element, automatically refining, under control of the at least one processor and based on the input indicating selection of the suggested keyword, the search results based on the search query and the suggested keyword; and in response to the automatic refining, automatically presenting, via the communication interface and under control of the at least one processor, an updated communication interface comprising refined search results corresponding to the search query and the suggested keyword, wherein the plurality of objects belonging to the category is hierarchically arranged in a tree structure with each category disposed at a node; and wherein the weighting value of each of the plurality of terms is defined based on: (a) an appearance frequency of a corresponding term; and (b) a contrary category frequency defined by a number of child categories of the category, and a number of child categories where the corresponding term is collected among the child categories.

7. The information providing method according to claim 6, wherein the weighting value of each of the plurality of terms is defined based on a product of:
   (a) the appearance frequency of the corresponding term; and
   (b) the contrary category frequency defined by the number of child categories of the category, and the number of child categories where the corresponding term is collected among the child categories.

8. One or more non-transitory storage mediums storing computer readable instructions, the computer readable instructions, when executed by one or more processors, causing the one or more processors to:
   receive, from a user terminal via a communication interface, a search query;
   obtain a ranking of a plurality of objects belonging to a category corresponding to the search query;
   collect a plurality of terms relevant to an object that is ranked at an upper position in the obtained ranking, each of the plurality of terms corresponding to at least one from among a text contained in a web page for the object and a search query that triggers the web page to be viewed;
   identify a weighting value of each of the plurality of terms;
   present, to the user terminal via the communication interface, (i) search results corresponding to the search query and (ii) a term that is ranked at an upper ranking position of the plurality of terms according to the weighting value of each of the plurality of terms, the term presented as a suggested keyword for search refinement of the object belonging to the category, the suggested keyword rendered within the communication interface as a selectable interface element configured to automatically trigger search refinement upon selection;
   receive, from the user terminal via the communication interface, a selection of the suggested keyword by receiving a selection of the selectable interface element;
   in response to receiving the selection of the selectable interface element, automatically refine, based on the input indicating selection of the suggested keyword, the search results based on the search query and the suggested keyword; and
   in response to the automatic refining, automatically present to the user terminal via the communication interface, an updated communication interface comprising refined search results corresponding to the search query and the suggested keyword,
   wherein the plurality of objects belonging to the category is hierarchically arranged in a tree structure with each category disposed at a node; and
   wherein the weighting value of each of the plurality of terms is defined based on:
      (a) an appearance frequency of a corresponding term; and
      (b) a contrary category frequency defined by a number of child categories of the category, and a number of child categories where the corresponding term is collected among the child categories.

9. The information providing method according to claim 8, wherein the weighting value of each of the plurality of terms is defined based on a product of:
   (a) the appearance frequency of the corresponding term; and
   (b) the contrary category frequency defined by the number of child categories of the category, and the number of child categories where the corresponding term is collected among the child categories.

* * * * *